March 20, 1956     C. R. PATON     2,738,985
MOTOR VEHICLE REAR WHEEL SUSPENSION MECHANISM
Filed June 16, 1952     3 Sheets-Sheet 1
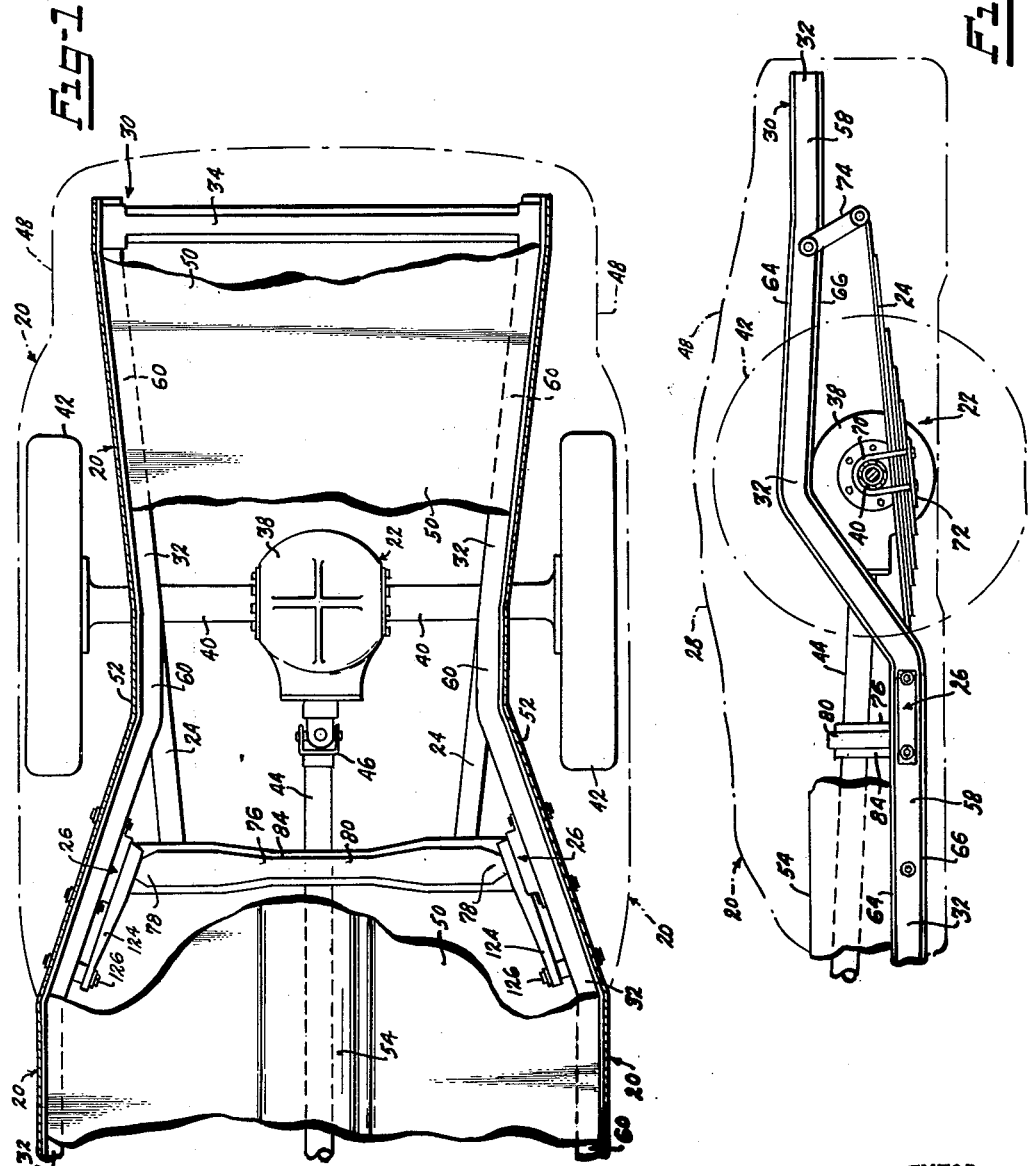
INVENTOR.
CLYDE R. PATON
BY
Wallace P. Lamb
ATTORNEY March 20, 1956 C. R. PATON 2,738,985
MOTOR VEHICLE REAR WHEEL SUSPENSION MECHANISM
Filed June 16, 1952 3 Sheets-Sheet 2
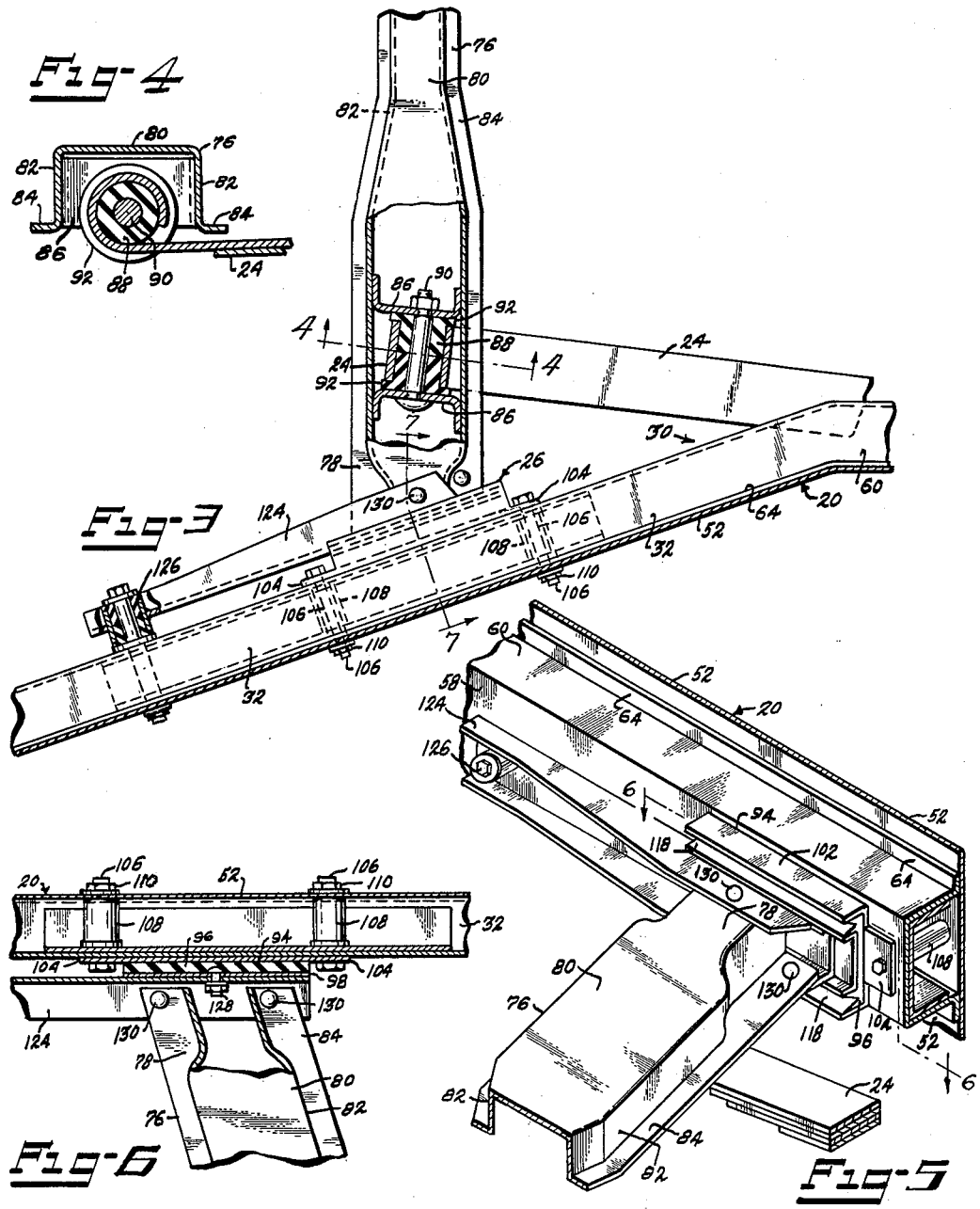
INVENTOR.
CLYDE R. PATON
BY
ATTORNEY March 20, 1956  C. R. PATON  2,738,985
MOTOR VEHICLE REAR WHEEL SUSPENSION MECHANISM
Filed June 16, 1952  3 Sheets-Sheet 3
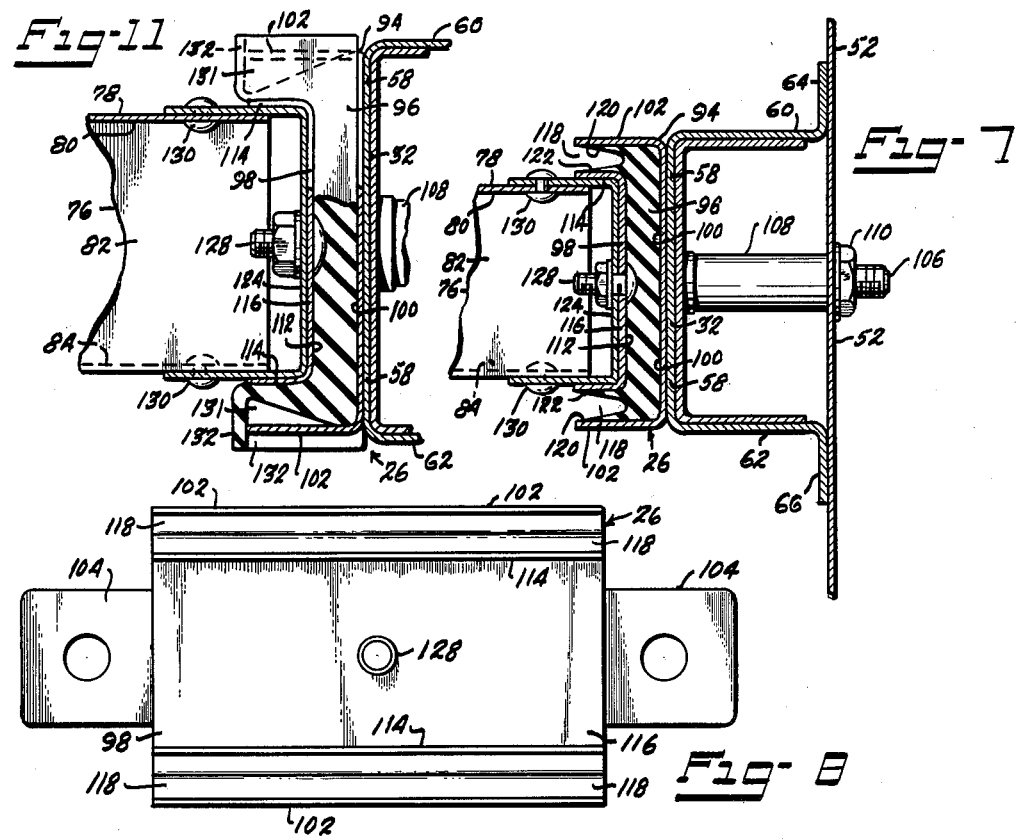
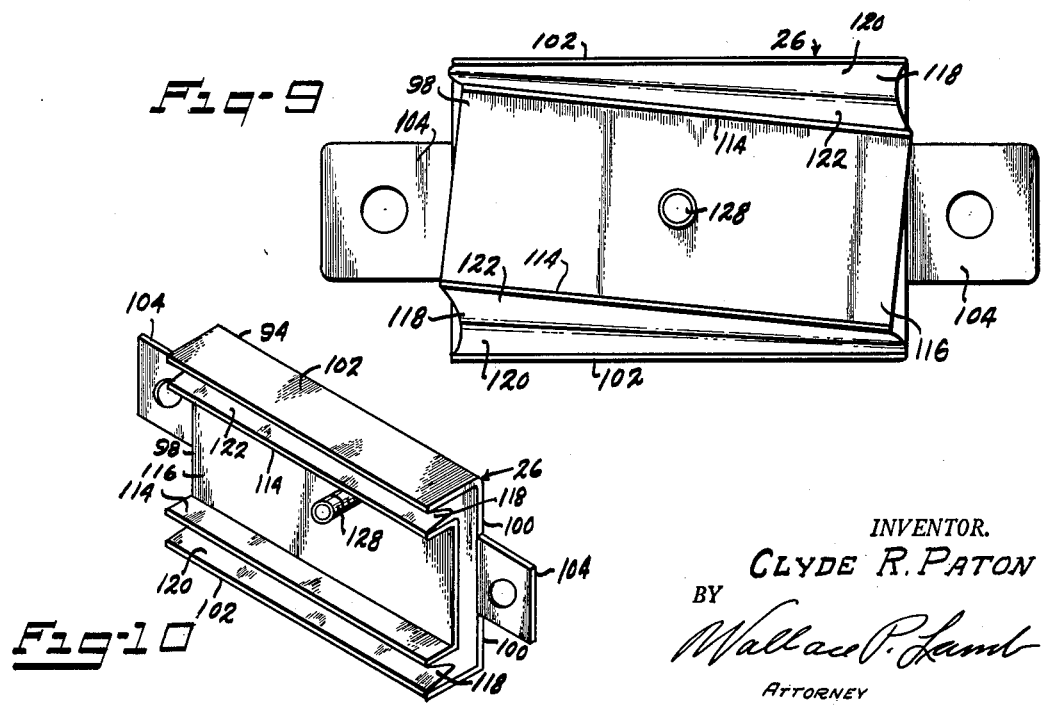
INVENTOR.
CLYDE R. PATON
BY
ATTORNEY

United States Patent Office 2,738,985
Patented Mar. 20, 1956

2,738,985

MOTOR VEHICLE REAR WHEEL SUSPENSION MECHANISM

Clyde R. Paton, Birmingham, Mich.

Application June 16, 1952, Serial No. 293,824

6 Claims. (Cl. 280—106.5)

This invention relates generally to automobiles and particularly to wheel suspension and noise suppressing mechanism therefor.

This application was copending with my application for Articulated Motor Vehicle Frame Structure, filed February 24, 1947, Serial No. 730,252, now Patent No. 2,633,203, dated March 31, 1953.

In the past, many types of rear wheel spring suspension mechanisms have been proposed for automobiles in an effort to obtain the optimum in noiseless and vibrationless vehicle operation. In addition to vibrations incited in the body by road irregularities, there has been the problem of suppressing audible vibrations incited by engine torque vibration transmitted by the propeller shaft to the driving axle in the differential housing, by sudden vehicle acceleration, and by deceleration or sudden braking, particularly in vehicles having the drive through the rear springs. These vibrations, whether they are road induced or whether they originate in the vehicle, are conducted through the rear axle housing and suspension springs to the body. Road induced and vibrations otherwise incited in the chassis are usually magnified manyfold by resonant vibration of the body floor pan which acts as a drum, and the resultant noise is, of course, objectionable. In the type of vehicle construction in which the body is separated from a chassis frame by spaced rubber pads, satisfactory noise suppression is usually not attained at certain resonant frequencies because if the pads are made sufficiently soft to absorb vibrations satisfactorily, the necessary rigidity between body and frame is sacrificed. As is well known, the present trend in motor vehicle manufacture is to integral frame and body structures in the interests of rigid construction, light weight and low cost, and that such construction facilitates transmission of both road induced vibrations and other vibrations originating in the vehicle, such as engine vibrations by conducting them directly to the floor pan from the suspension springs, thus adding to the problem of noise suppression of vibrations incited in the body structure via wheel suspension mechanism.

Accordingly, it is an object of the present invention to provide for motor vehicles an improved wheel suspension mechanism of a character and arrangement to give desired ride characteristics to motor vehicles together with desired suppression of vibration induced body noise.

Another object of the invention is to provide an improved wheel suspension-noise suppression mechanism which substantially decreases transmission of vibrations from a spring suspended rear axle to the frame or to the body of a vehicle.

Another object of the invention is to provide a new and improved arrangement of a spring suspension and noise suppressing spring mounting which is particularly desirable in vehicles which have integral frame and body and have the drive through rear leaf springs, as this combination, although desirable for many reasons, is at the same time conducive to prohibitive audible vibrations in the body.

Another object of the invention is to provide an improved mounting and noise suppressor mounting device for vehicle semi-elliptical springs.

Other objects of the invention will become apparent from the following detail description taken in connection with the accompanying drawing in which:

Fig. 1 is a fragmentary plan view of a motor vehicle chassis rear end, embodying features of the present invention;

Fig. 2 is a fragmentary side view of the vehicle of Fig. 1;

Fig. 3 is an enlarged fragmentary plan view of the vehicle showing particularly the wheel suspension and noise suppressing mechanism;

Fig. 4 is a cross sectional view taken along line 4—4 of Fig. 3 of parts of my improved wheel suspension mechanism and associated structure of the vehicle;

Fig. 5 is a fragmentary isometric view of my wheel suspension-noise suppressing mechanism and associated structure;

Fig. 6 is a horizontal sectional view of the mechanism, taken along the line 6—6 of Fig. 5;

Fig. 7 is a vertical cross sectional view of the spring suspension-noise suppressor, taken along line 7—7 of Fig. 3 through a spring mounting member;

Fig. 8 is an elevational view of one of the spring mounting members;

Fig. 9 is a view similar to Fig. 8 illustrating the function of the mounting;

Fig. 10 is an isometric view of the spring mounting;

Fig. 11 is a view similar to Fig. 7 showing a modification thereof.

Referring to the drawings by characters of reference, the motor vehicle represented comprises, in part, a body 20, a rear end assembly 22, suspension or semi-elliptical leaf springs 24, and suspension spring mountings 26. The rear end assembly 22 is suspended from the body 20 by the leaf springs 24 and the mountings 26 cooperate with the leaf springs to effect desired ride qualities of the vehicle together with suppression of audible vibrations which would otherwise be incited in the body.

The type body which I have selected to illustrate in connection with the present invention is of the so-called integral frame and body type as objectionable audible vibrations are more pronounced therein, but it is to be understood that the invention is equally applicable to other body types for, among other reasons, my suspension and mounting improve the riding qualities of a vehicle, as well as suppress audible vibrations. In general, the body 20 comprises an upper body structure 28 and an underbody supporting member or frame 30. These are preferably rigidly secured together by welding.

The frame 30 may be constructed of spaced, side frame members 32, a rear cross member 34 and other forwardly disposed spaced cross members (not shown). Preferably, the side frame members 32 and the frame cross members 34 are welded together to provide a rigid structure.

Generally represented in Figs. 1 and 2, the rear end assembly 22 is a conventional type having the usual driving gears and differential in a housing 38, axles in housings 40, and road wheels 42 on the axles. Also represented in Figs. 1 and 2 is a propeller shaft 44 coupled to the differential by a universal coupling 46.

The body 20 may have conventional framework structure (not shown), panels 48, and a sheet metal floor pan 50, all of which may be welded together and to the underbody frame 30. In the floor pan 50 is formed a longitudinally extending clearance tunnel 54 for receiving the propeller shaft 44. Also, the body 20 includes opposite wheel housing panels 52 which extend downwardly over and are secured respectively and preferably by welding to the side frame members 32.

As shown more clearly in Fig. 7, the underbody side frame members 32 may be channel shape in cross section, having a vertical web 58 and horizontal upper and lower outturned flanges 60 and 62 respectively. The channel flanges 60, 62 respectively have upturned and downturned flange portions 64, 66 to which the wheel housing panels 52 are preferably welded and with which they form box-like sections.

The pair of semi-elliptical leaf springs 24 are located respectively within the body wheel housings below the side frame members 32. Intermediate their ends, each of the springs 24 may be secured respectively to the rear axle housings 40 by conventional U-bolts 70 and backing plates 72, and each of the springs may be attached at its rear end respectively to the side frame members 32 by shackles and bolts 74.

With the exception of my mountings 26, the description to this point is general of well known or conventional motor vehicle construction using the well known Hotchkiss type of drive in which I have found that undesirable vibrations conducted via the suspension springs 24 to the body 20 are transmitted in large measure at the forward ends of the springs where they are attached to the body or to the underbody frame. It will be understood that my vibration absorbing means may be successfully employed with drives other than the Hotchkiss type of drive.

Accordingly, I have provided for the front end of each of the springs 24 the improved resilient mountings 26 which I have constructed and so arranged as to allow definite, but cushioned up and down arcuate movement of the spring front ends to effect desired cushioned drive, riding and noise reducing qualities in the vehicle together with suppression of audible vibrations which would otherwise be conducted to and magnified by the body elements such as floor pan 50.

The resilient mountings 26 are carried respectively by the underbody side frame members 32 and resiliently support a cross or tie member 76 to which the front ends of the springs 24 are attached in spaced apart relation inwardly of the mountings 26. By this arrangement, the cross member 76 functions to tie the front ends of the springs 24 together, and to the outwardly positioned mountings 26. In this regard, it will be understood that outer end portions, designated 78, of the cross member 76 serve as arms that extend laterally from the spring ends toward their respective mountings 26.

In the present construction, the spring suspension cross member 76 is a channel shape member having substantial mass and having a horizontal web 80, downturned side flanges 82 and outturned reinforcing side flange portions 84.

The front ends of the springs 24 position respectively between pairs of lugs 86 which are welded to and depend from the spring suspension cross member 76. In the front eye of each spring 24 is provided a rubber bushing 88 through which a bolt 90 extends to attach the spring end to the lugs 86. Bushing 88 is made in two tubular sections which are inserted in opposite ends of the spring eye and have outer end flanges 92 to prevent metal to metal contact between the spring ends and the lugs 86. When the nuts are tightened on the bolts 90, the bushing rubber is crowded about the bolt and against the wall of the spring eye to obtain a bond-like connection between the parts. That is, relative movement between the front ends of springs 24 and their cross tie member 76 occurs only by the yielding of the bushing rubber. This provides a desirable vibration insulator which contributes to suppression of transmitted high frequency vibrations and to excellency of the vehicle ride and noise qualities.

Since the mountings 26 for each of the front ends of springs 24 are the same in construction and function, a detailed description of one of them is deemed sufficient. The mounting 26 comprises, in general, a mounting plate or holder 94, a resilient mounting member or rubber pad 96, and a movable bearing member 98. The holder 94 retains the rubber pad 96 and the rubber pad carries the bearing member 98 which in turn carries the lateral spring arm 78.

In the interests of low manufacturing costs, I make the mounting holder 94 of sheet metal channel stock having a web or base 100 and top and bottom retainer flanges 102. In position on the side frame members 32, the channel holder 94 extends longitudinally thereof or lengthwise of the vehicle. At the ends of the channel 94, the web 100 thereof may be extended to provide mounting tabs 104 for bolts 106 and the channel-shaped side frame members 32. In the present construction, the bolts 106 extend through spacers 108 in side frame members and through the wheel house panel 52 to receive nuts 110 so that the latter will be accessible from the wheel house for assembly and disassembly purposes.

The rubber pad 96 fits complementary into the channel holder 94 and may be bonded or be otherwise suitably secured to the inner surfaces thereof. In the outer face of the rubber pad 96, I provide a recess 112 to receive the bearing member 98 which is largely embedded in the rubber. The recess 112 is preferably rectangular in shape and the bearing member 98 may be of channel stock having top and bottom flanges 114 and a web 116 securely bonded or otherwise suitably secured to the walls of the recess. Above and below the bearing member 98, I provide parallel recesses 118 in the rubber pad to give greater flexibility thereto for desired vertical movement of the bearing. These grooves 118 also provide upper bumpers 120 and lower bumpers 122 as limit stops to prevent metal to metal contact when severe road obstructions are encountered or when temporary high loads such as when high accelerating or braking conditions occur.

On the other side of the cross member 76 from the spring 24 I provide another spring extension or torsion arm 124 which together with a rubber bushing 126 acts to limit arcuate movement of the spring front end on its mounting 26. Arm 124, preferably of channel stock, has one end portion fitting complementary with the channel shaped bearing member 98 of the resilient mounting 26, and the parts are secured together by bolts 128. Rubber bushing 126, like the previously described bushing 88, effects a bond-like connection between the holding bolt and arm 124 so that movement of the arm is dependent upon yieldability of the rubber. The spring suspension cross member 76 may be connected through the arm 124 to the resilient mounting bearing 98 by securing the ends of the cross member 76 respectively to the arms 124 by rivets 130 or by any other suitable securing means.

When a rear wheel of the vehicle encounters a road irregularity, the front end of the corresponding spring 24 will move arcuately on its mounting pad displacing the rubber to absorb the shock and vibrations including audible vibrations. When the wheel or wheels are encountering ordinary rough roads or slight road irregularities, the cushioning action is done substantially entirely by the rubber pads. This arcuate action of the front ends of the springs on the rubber pads is resiliently opposed by the torsion arms 124 with opposing force corresponding to the severity of the wheel action. When unusually severe road obstacles are met by the vehicle rear wheels, or when rapid starts or stops are made, action of the spring front ends is limited by the rubber stops 120, 122 in the mounting pads 96. Whether traversing rough or smooth roads, vibrations originating in the vehicle such as by engine torque vibration and incited in the rear axle and transmitted by the springs 24 are suppressed by the rubber pads 96 which materially decrease transmission of the vibrations and resultant noise to the body. As illustrated in Fig. 9, when springs 24 are flexed, the spring end bearing members 98 move down through arcuate paths and displace rubber of pads 96 in the absorption of shocks and audible vibrations.

The modification of Fig. 11 is similar to the mount of Figs. 7 to 10 inclusive and therefore like parts are designated by like characters of reference. The rubber mounting pad 96 between channels 98 and 100 is of channel shape and, like the previously described pad of Fig. 8, has its opposite side surfaces united, as by a bonding process respectively to the webs of the metal channels 98 and 100. The legs or flanges of the rubber pad 96 are also preferably bonded to the flanges of channel 98, but are spaced from the flanges 102 of outer channel 100 to provide the necessary clearance spaces 131 for movement of the inner channel which is resisted only by the soft rubber mounting pad. In order to insure that the clearance spaces 130 do not become clogged with dirt, stones and other foreign matter which might render the mountings ineffective, I form the rubber mounting flanges with outturned portions or lips 132 which overlie and close the entrances to the spaces 130 of the side face of the pad and end portions or lips 134 which close the ends of the clearance spaces.

From the foregoing description, it will be understood that I have provided an improved motor vehicle in which rear suspension springs are mounted in cooperation with resilient mounts to provide desired riding qualities together with suppression of audible vibrations. By arranging the rubber mounts for the forward ends of the springs laterally thereof with the rubber in sheer, I have found that a much improved ride is obtained and with material decrease in transmission of audible vibrations to the vehicle body. In addition, I have provided by means of torsion arms for limiting the longitudinal action of the comparatively soft spring mounts in accordance with the requirements of road roughness and under conditions of rapid acceleration or braking of the vehicle.

I claim:

1. In a motor vehicle having a rear axle housing, a longitudinal body supporting member, a leaf spring for attachment intermediate its ends to the axle housing and having a rear end pivotally attached to said longitudinal body supporting member, a rubber pad secured to said longitudinal body supporting member laterally of the front end of said leaf spring, means fulcruming the front end of said spring on said rubber pad, and a torsion arm connecting said means to said longitudinal body supporting member to limit displacement of the rubber by pivoting action of the front end of said spring.

2. In a motor vehicle having a rear axle housing, a body supporting member, a leaf spring for attachment intermediate its ends to the axle housing and having a rear end pivotally attached to said body supporting member, a cross member rotatable about an axis extending laterally of said body supporting member, a rubber pad secured to said body supporting member, a plate bonded to said rubber pad and securing one end of said cross member thereto, said rubber pad yieldingly opposing rotation of said cross member and absorbing vibrations, means attaching the front end of said spring to said cross member, and a torsion arm on the other side of said cross member from said spring connecting said cross member to said body supporting member.

3. In a motor vehicle, a rear axle housing, a body supporting member, a leaf spring connected intermediate its ends to said axle housing and at its rear end to said body supporting member, a rubber pad on said body supporting member spaced from and laterally of the front end of said spring, said rubber pad having one side surface thereof united solely with the body supporting member, a plate united flat to the other side surface of the rubber pad, an arm connected to said spring extending laterally therefrom and secured to said plate and yieldable means on said body supporting member connected to said plate to limit fore and aft movement thereof.

4. In a motor vehicle having a rear axle housing, a body supporting member, a leaf spring attached intermediate the ends thereof to said axle housing and having a rear end attached to said body supporting member, a rubber pad secured to said body supporting member laterally of the front end of said spring, means attaching the front end of said spring to said rubber pad, and resilient means attached to said first means limiting displacement of the rubber pad by the front end of said spring.

5. In a motor vehicle having a rear axle housing, a longitudinal body supporting member, a leaf spring attached intermediate its ends to said housing and at its rear end to said supporting member, a cross member rotatable about an axis extending transverse to said supporting member, a rubber pad secured to said supporting member, means securing one end of said rotatable cross member to one face of said rubber pad, means attaching the front end of said spring to said cross member, and resilient means increasingly opposing rotation of said cross member and mounted on said supporting member.

6. In a motor vehicle having a rear axle housing, a longitudinal body supporting member, a leaf spring attached intermediate its ends to said housing and having its rear end attached to said supporting member, a cross member extending transversely to said supporting member and rotatable about an axis transverse thereto, a rubber pad mounted on said supporting member, an arm having one end pivoted on said supporting member and extending longitudinally thereof having its other end interposed between one end of said cross member and said rubber pad, means attaching said rubber pad to said supporting member and to said cross member, and resilient means yieldingly opposing pivoting of said arm.

References Cited in the file of this patent

UNITED STATES PATENTS

| 1,850,004 | Farkas | Mar. 15, 1932 |
| 1,867,708 | Paton | July 19, 1932 |
| 1,899,293 | Robertson | Feb. 28, 1933 |
| 2,016,207 | Lindenberg | Oct. 1, 1935 |
| 2,116,988 | Tremaine | May 10, 1938 |
| 2,177,897 | Lee | Oct. 31, 1939 |
| 2,301,593 | Ulrich | Nov. 10, 1942 |
| 2,611,625 | Kishline | Sept. 23, 1952 |

FOREIGN PATENTS

| 543,511 | Great Britain | Mar. 2, 1942 |